(12) United States Patent
Masuda et al.

(10) Patent No.: US 6,186,697 B1
(45) Date of Patent: Feb. 13, 2001

(54) POWER TRANSMISSION DEVICES WITH IMPACT ABSORBING POTENTIAL

(75) Inventors: Toshiyuki Masuda; Masao Kishi; Yasuo Katagiri, all of Kanagawa (JP)

(73) Assignee: Unisia Jecs Corporation, Atsugi (JP)

( * ) Notice: Under 35 U.S.C. 154(b), the term of this patent shall be extended for 0 days.

(21) Appl. No.: 09/023,701

(22) Filed: Feb. 13, 1998

(30) Foreign Application Priority Data

Mar. 18, 1997 (JP) ................................... 9-083373

(51) Int. Cl.$^7$ ................................................ F16D 9/10
(52) U.S. Cl. ................................ 403/359.5; 403/379.2; 464/182
(58) Field of Search .................. 403/359.5, 359.1, 403/378, 379.5, 379.2, 50, 51; 464/183, 170, 173, 179, 182, 32

(56) References Cited

U.S. PATENT DOCUMENTS

| | | | |
|---|---|---|---|
| 3,472,046 | 10/1969 | Potter . | |
| 3,800,555 | * 4/1974 | Arneson | 464/180 |
| 4,167,860 | * 9/1979 | Sakaguchi et al. | 464/123 |
| 4,184,345 | 1/1980 | Cutler . | |
| 4,279,131 | * 7/1981 | Pringle | 464/120 |
| 4,752,275 | 6/1988 | Lindenthal et al. . | |
| 4,756,240 | * 7/1988 | Mielke | 403/150 |
| 5,411,383 | * 5/1995 | Parnell et al. | 403/376 |
| 5,562,360 | * 10/1996 | Huang | 403/379 |

FOREIGN PATENT DOCUMENTS

| | | |
|---|---|---|
| 0 370 653 | 5/1990 | (EP) . |
| WO 97/07344 | 2/1997 | (WO) . |

* cited by examiner

*Primary Examiner*—Lynne H. Browne
*Assistant Examiner*—Kenneth Thompson
(74) *Attorney, Agent, or Firm*—Foley & Lardner

(57) ABSTRACT

A power transmission device with impact absorbing potential includes a shaft, a tube engaged with said shaft, a spline joint for interconnecting the shaft and the tube, and a breakable pin arranged through through holes of the shaft and the tube. A tube is mounted at an end of the tube to conceal the through hole of the tube.

9 Claims, 2 Drawing Sheets

POWER TRANSMISSION DEVICES WITH IMPACT ABSORBING POTENTIAL

BACKGROUND OF THE INVENTION

The present invention relates to power transmission devices which can absorb axial impact energy for use, e.g. in propeller shafts and steering columns for motor vehicles.

One of the power transmission devices of this type is disclosed, e.g. in U.S. Pat. No. 4,183,258 wherein a shaft and a tube engaged therewith are interconnected by a spline joint to relatively be movable in the axial direction and not to relatively be rotatable in the direction of rotation, and they are also interconnected by a breakable pin arranged through through holes of the shaft and the tube.

The power transmission device ensures torque transmission between the shaft and the tube. When axially undergoing a force or impact greater than a predetermined value, the device absorbs impact energy through relative axial movement of the shaft and the tube produced by breaking of the breakable pin.

With the known power transmission device, the breakable pin is arranged through the through hole of the shaft and that of the tube which has outer peripheral openings communicating with the air. As a consequence, when the shaft and the tube are rotated for power transmission, the breakable pin can be disengaged with the through holes. Moreover, when muddy water, etc. enter the through holes from the outer peripheral openings, the breakable pin may be corroded by formation of rust to vary its breaking load, resulting in impossible achievement of a desired impact absorbing effect.

It is, therefore, an object of the present invention to provide power transmission devices with impact absorbing potential, which allow sure and constant engagement of the component parts, and stable impact absorbing effect.

SUMMARY OF THE INVENTION

One aspect of the present invention lies in providing a device for transmitting power with impact absorbing potential, comprising:

a shaft formed with a through hole;

a tube engaged with said shaft, said tube having an end formed with a through hole;

a sliding joint arranged to interconnect said is shaft and said tube;

a pin arranged through said through holes of said shaft and said tube; and a member mounted at said end of said tube, said member being disposed on said through hole of said tube.

Another aspect of the present invention lies in providing a device for transmitting power with impact absorbing potential, comprising:

a shaft formed with a through hole;

a tube engaged with said shaft, said tube having an end formed with a through hole;

a sliding joint arranged to interconnect said shaft and said tube;

a pin arranged through said through holes of said shaft and said tube; and means for concealing said trough hole of said tube.

DETAILED DESCRIPTION OF THE INVENTION

Figure 1:
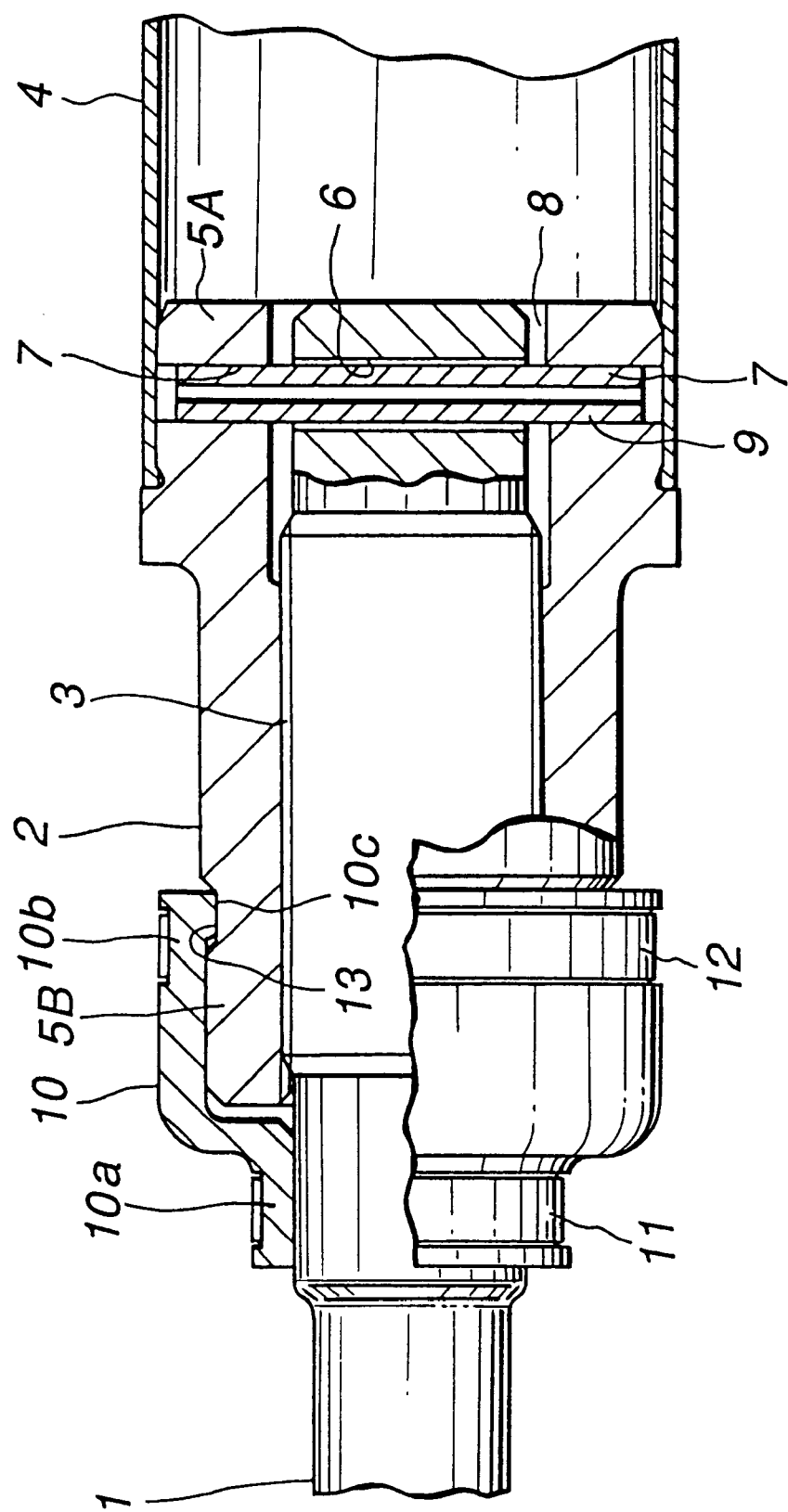
FIG. 1 is a longitudinal section showing a first embodiment of a power transmission device with impact absorbing potential according to the present invention.

Referring to the drawings wherein like reference numerals designate like parts throughout the views, a description will be made with regard to a power transmission device with impact absorbing potential embodying the present invention.

FIG. 1 shows a first embodiment of the present invention. Referring to FIG. 1, the power transmission device comprises a shaft 1 and a tube 2 engaged therewith. The shaft 1 and the tube 2 are interconnected by a spline joint or sliding joint 3 to relatively be movable in the axial direction and not to relatively be rotatable in the direction of rotation. Specifically, the shaft 1 is formed with an outer spline, whereas the tube 2 is formed with an inner spline. The outer spline of the shaft 1 and the inner spline of the tube 2 are engaged with each other slidably or with slight press-fit load.

A tubular member 4, which ensures power transmission, is made of a hard material such as metal or fiber reinforced synthetic resin. The tubular member 4 is mounted to an end of the tube 2, i.e. a right end 5A thereof as viewed in FIG. 1. Specifically, the end 5A of the tube 2 has an outer peripheral portion having reduced diameter by substantially the thickness of the tubular member 4 and extending to a predetermined length. The tubular member 4 has an end press engaged with the outer peripheral portion of the end 5A of the tubular member 4, and fixed thereto through welding or bonding.

The shaft 1 and the tube 2 have, in the position axially distant from the spline joint 3, i.e. in the position distant rightward therefrom, through holes 6, 7 to extend radially. The through holes 6, 7 of the shaft 1 and the tube 2 are disposed concentrically. The through hole 6 of the shaft 1 is larger in diameter than the through hole 7 of the tube 2. The through hole 7 is formed at the end 5A, and has an opening which faces the inner periphery of the tubular member 4. Therefore, the tubular member 4 directly contacts the opening of the through hole 7 to conceal it. The through holes 6, 7 can easily be formed by a drill, etc.

The end of the shaft 1 with the through hole 6 is decreased in outer diameter, whereas the end 5A of the tube 2 with the through hole 7 is increased in inner diameter. Thus, when engaging the two ends, a predetermined annular clearance 8 is defined between the outer periphery of the shaft 1 and the inner periphery of the tube 2.

A breakable pin 9 is arranged through the through holes 6, 7 of the shaft 1 and the tube 2 to interconnect the two. Due to the fact that the through hole 6 of the shaft 1 is larger in diameter than the through hole 7 of the tube 2, the breakable pin 9 is arranged through the through hole 6 with a predetermined clearance, and the through hole 7 with substantially no clearance.

When the shaft 1 and the tube 2 axially undergo force or impact greater than a predetermined value, the breakable pin 9 is broken to allow relative axial movement of the shaft 1 and the tube 2, absorbing impact energy. Thus, the breakable pin 9 is made of a predetermined material, and hollowed with a predetermined section modulus.

A boot 10, which ensures sealing of the spline joint 3, is made of a soft material such as rubber or synthetic resin. The boot 10 is shaped like a stepped cylinder with small- and large-diameter portions 10a, 10b. The small-diameter portion 10a is mounted to the outer periphery of the shaft 1 by a fixing band 11, whereas the large-diameter portion 10b is mounted to the outer periphery of another end of the tube 2, i.e. a left end 5B thereof as viewed in FIG. 1 by a fixing band 12. Thus, the boot 10 seals the spline joint 3 between the shaft 1 and the tube 2 to shut it off from the air, preventing entrance of muddy water, etc. Moreover, the large-diameter portion 10b of the boot 10 has at the inner periphery a reduced-diameter portion 10c which is engaged with an annular groove 13 formed at the outer periphery of the tube 2, reinforcing mounting of the boot 10.

The power transmission device having the above structure is applied with one of the shaft 1 and the tube 2 being connected to a drive unit, not shown, and another being connected to a non-drive unit, not shown.

When the shaft 1 is connected to the drive unit, torque input from the drive unit to the shaft 1 is transmitted to the tube 2 and the tubular member 4 through the spline joint 3, which is then transmitted to the non-drive unit connected to the tubular member 4. At that time, a slight force axially acting on the shaft 1 and the tube 2 is carried by a press-fit load of the spline joint 3 and a shearing resistance of the breakable pin 9.

When the shaft 1 or the tube 2 undergoes a force or impact greater than the predetermined value, the breakable pin 9 is broken to allow relative axial movement of the shaft 1 and the tube 2, absorbing impact energy.

The opening of the through hole 7 of the tube 2, which faces the inner periphery of the tubular member 4, is concealed by the tubular member 4, so that even when the shaft 1 and the tube 2 are rotated at high speed for power transmission, the breakable pin 9 may not be disengaged with the through hole 6. Moreover, the tubular member 4 prevents muddy water, etc. from entering the through hole 7, so that the breakable pin 9 may not be corroded by formation of rust, resulting in achievement of a desired impact absorbing effect.

Therefore, according to the first embodiment, the power transmission device with impact absorbing potential is obtained which can not only prevent disengagement of the breakable pin 9 for interconnecting the shaft 1 and the tube 2, but achieve a stable breaking load.

Further, the through holes 6, 7 of the shaft 1 and the tube 2 are located in the position axially distant from the spline joint 3, so that when a force or impact greater than the predetermined value axially acting on the shaft 1 and the tube 2 breaks the breakable pin 9, and the shaft 1 and the tube 2 are moved relatively axially, broken pieces of the breakable pin 9 may not enter a slide clearance of the spline joint 3. In the first embodiment as shown in FIG. 1, in particular, broken pieces of the breakable pin 9 are immediately discharged from the annular clearance 8 between the shaft 1 and the tube 2, resulting in achievement of a stable impact absorbing effect.

Furthermore, the breakable pin 9 is arranged through the through hole 6 of the shaft 1 with the predetermined clearance, so that when the shaft 1 and the tube 2 ensure power transmission through the spline joint 3, a shearing force due to transmitted torque does not act on the breakable pin 9.

Figure 2:
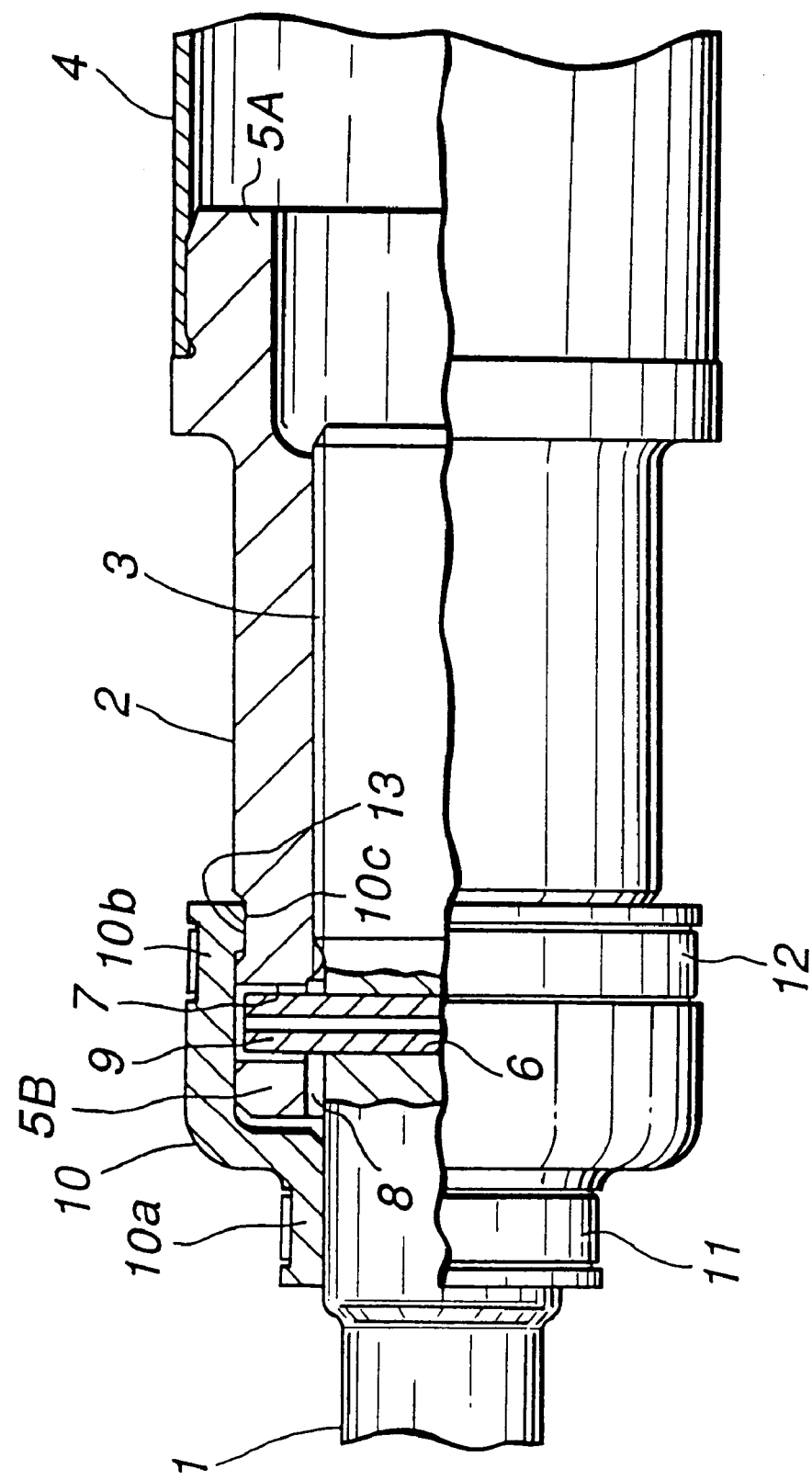
FIG. 2 is a view similar to FIG. 1, showing a second embodiment of the present invention.

FIG. 2 shows a second embodiment of the present invention which is substantially the same as the first embodiment. In the second embodiment, the through hole 7 is formed at the end 5B of the tube 2 which is axially distant from the spline joint 3, and have an opening which faces the inner periphery of the boot 10. Thus, the boot 10 directly contacts the opening of the through hole 7 to conceal it.

The shaft 1 has the through hole 6 to correspond to the through hole 7 of the tube 2. That is, the through hole 6 of the shaft 1 and the through hole 7 of the tube 2 are disposed concentrically. The through hole 6 of the shaft 1 is smaller in diameter than the through hole 7 of the tube 2.

The portion of the shaft 1 with the through hole 6 is decreased in outer diameter, whereas the end 5B of the tube 2 with the trough hole 7 is increased in inner diameter. Thus, when engaging the two, the predetermined annular clearance 8 is defined between the outer periphery of the shaft 1 and the inner periphery of the tube 2.

The breakable pin 9 is arranged through the through holes 6, 7 of the shaft 1 and the tube 2 to interconnect the two. Due to the fact that the through hole 6 of the shaft 1 is smaller in diameter than the through hole 7 of the tube 2, the breakable pin 9 is arranged through the through hole 6 with substantially no clearance, and the through hole 7 with a predetermined clearance.

According to the second embodiment, the boot 10 mounted to the end 5B of the tube 2 prevents not only disengagement of the breakable pin 9, but entrance of muddy water, etc. into the through hole 7. By the latter effect, the breakable pin 9 may not be corroded by formation of rust.

Therefore, according to the second embodiment, in the same way as the first embodiment, the power transmission device with impact absorbing potential is obtained which can not only prevent disengagement of the breakable pin 9 for interconnecting the shaft 1 and the tube 2, but achieve a stable breaking load.

Further, the through holes 6, 7 of the shaft 1 and the tube 2 are located in the position axially distant from the spline joint 3, so that when the breakable pin 9 is broken, and the shaft 1 and the tube 2 are moved relatively axially, broken pieces of the breakable pin 9 may not enter a slide clearance of the spline joint 3. In the second embodiment as shown in FIG. 2, in particular, broken pieces of the breakable pin 9 are immediately discharged from the annular clearance 8 between the shaft 1 and the tube 2, resulting in achievement of a stable impact absorbing effect.

Furthermore, the breakable pin 9 is arranged through the through hole 7 of the tube 2 with the predetermined clearance, so that when the shaft 1 and the tube 2 ensure power transmission through the spline joint 3, a shearing force due to transmitted torque does not act on the breakable pin 9.

Still further, the breakable pin 9 can be arranged through the through holes 6, 7 after mounting the tubular member 4 to the tube 2, resulting in easy assembling of the device.

Having described the present invention with regard to the preferred embodiments, it is noted that the present invention is not limited thereto, and various changes and modifications can be made without departing from the scope of the present invention. By way of example, the breakable pin 9 may be arranged through both of the through holes 6, 7 with no clearance or a predetermined clearance. Moreover, the boot 10 may be expansible in the form of bellows.

What is claimed is:

1. A device for transmitting power with axial impact absorbing potential for use in a motor vehicle, comprising:
   a shaft formed with a through hole;
   a tube engaged coaxially with said shaft, said tube having an end formed with a through hole;
   a breakable pin arranged through said through holes of said shaft and said tube, said pin being adapted to break upon application of an axial load that exceeds a predetermined threshold;

a sliding joint arranged to interconnect said shaft and said tube, said sliding joint having engaged portions which are adapted to maintain coaxial alignment of said shaft and said tube and transmit torque between said shaft and said tube when said pin is unbroken, and, when said pin is broken, allow relative axial impact absorbing movement between said shaft and said tube while maintaining coaxial alignment of said shaft and said tube and continuing to be able to transmit torque between said shaft and said tube throughout substantially the full extent of said relative axial impact absorbing movement; and a member engaged with said end of said tube, said member concealing said through hole of said tube.

2. A device as claimed in claim 1, wherein said sliding joint includes an outer spline of said shaft and an inner spline of said tube.

3. A device as claimed in claim 1, wherein said pin is made of a predetermined material, and hollowed with a predetermined section modulus.

4. A device as claimed in claim 1, wherein said member includes a tubular member.

5. A device as claimed in claim 1, wherein said member includes a boot.

6. A device as claimed in claim 1, wherein said through holes of said shaft and said tube are arranged axially distant from said sliding joint.

7. A device as claimed in claim 1, wherein said pin is arranged through at least one of said through holes of said shaft and said tube with a predetermined clearance.

8. A device for transmitting power with impact absorbing potential for use in a motor vehicle, comprising:

a shaft formed with a through hole;

a tube engaged coaxially with said shaft, said tube having one end formed with a through hole and another end;

a breakable pin arranged through said through holes of said shaft and said tube, said pin being adapted to break upon application of an axial load that exceeds a predetermined threshold;

a tubular member engaged with said one end of said tube, said tubular member concealing said through hole of said tube, said tubular member having an inner periphery directly exposed to the ends of said pin for direct contact by said pin to keep said pin from moving out of said through holes;

a sliding joint arranged to interconnect said shaft and said tube, said sliding joint having engaged portions which are adapted to maintain coaxial alignment of said shaft and said tube and transmit torque between said shaft and said tube when said pin is unbroken, and, when said pin is broken, allow relative axial impact absorbing movement between said shaft and said tube while maintaining coaxial alignment of said shaft and said tube and continuing to be able to transmit torque between said shaft and said tube throughout substantially the full extent of said relative axial impact absorbing movement; and a boot engaged with said another end of said tube.

9. A device for transmitting power with impact absorbing potential for use in a motor vehicle, comprising:

a shaft formed with a through hole;

a tube engaged coaxially with said shaft, said tube having one end formed with a through hole and another end;

a breakable pin arranged through said through holes of said shaft and said tube, said pin being adapted to break upon application of an axial load that exceeds a predetermined threshold;

a tubular member engaged with said another end of said tube;

a sliding joint arranged to interconnect said shaft and said tube, said sliding joint having engaged portions which are adapted to maintain coaxial alignment of said shaft and said tube and transmit torque between said shaft and said tube when said pin is unbroken, and, when said pin is broken, allow relative axial impact absorbing movement between said shaft and said tube while maintaining coaxial alignment of said shaft and said tube and continuing to be able to transmit torque between said shaft and said tube throughout substantially the full extent of said relative axial impact absorbing movement; and a boot engaged with said one end of said tube, said boot concealing said through hole of said tube, said boot having an inner periphery directly exposed to the ends of said pin for direct contact by said pin to keep said pin from moving out of said through holes.

* * * * *